United States Patent [19]

Geoffrey

[11] 4,256,330
[45] Mar. 17, 1981

[54] PASSIVE SEAT BELT SYSTEM

[75] Inventor: James E. Geoffrey, Livonia, Mich.

[73] Assignee: Ford Motor Company, Dearborn, Mich.

[21] Appl. No.: 105,825

[22] Filed: Dec. 20, 1979

[51] Int. Cl.³ ............................................. B60R 21/10
[52] U.S. Cl. .................................................. 280/802
[58] Field of Search ........................ 280/802, 803, 808

[56] References Cited

U.S. PATENT DOCUMENTS

| 3,679,229 | 7/1972 | Weststrate | 280/803 |
| 3,941,419 | 3/1976 | Blom | 280/808 |
| 3,976,305 | 8/1976 | Fieni | 280/802 |
| 4,159,834 | 7/1979 | Miller | 280/802 |
| 4,165,100 | 8/1979 | Takada | 280/802 |
| 4,189,170 | 2/1980 | Tanaka | 280/802 |
| 4,201,401 | 5/1980 | Brynn | 280/803 |

*Primary Examiner*—Robert R. Song

*Attorney, Agent, or Firm*—John J. Roethel; Clifford L. Sadler

[57] ABSTRACT

A passive seat belt system having a belt anchored to a hinged vehicle door at upper and lower anchorage points and a strap extending from an inboard retractor mechanism to a slip ring slidably on the belt. In door closed position, the portions of the belt between the slip ring and the lower anchorage point and the slip ring and the upper anchorage point forming a lap belt segment and a torso belt segment, respectively, for restraining a seat occupant on a vehicle seat. A fixed web stop located on the lap belt is sized to prevent its passage through the slip ring as the door is opened. The effective length of the torso segment becomes fixed upon engagement of the web stop with the slip ring causing the torso segment and retractor strap to be placed under linear tension and the retractor strap and belt segments to be lifted upwardly and forwardly of a seat occupant.

4 Claims, 3 Drawing Figures

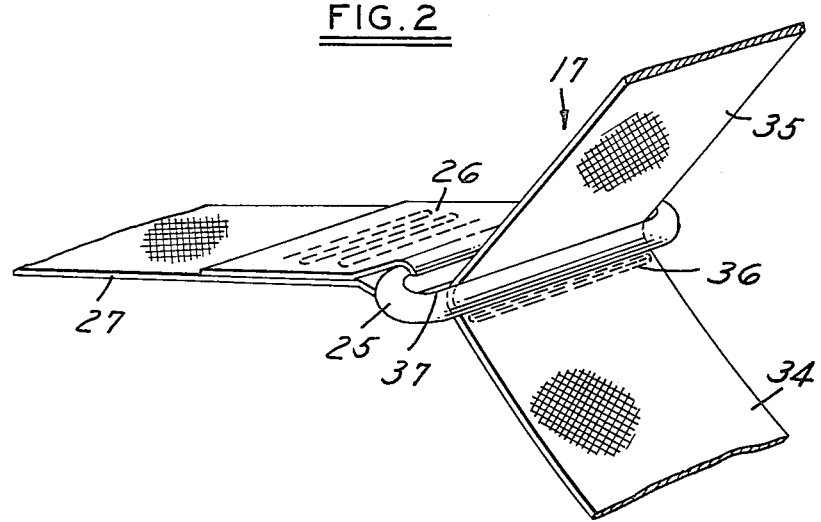
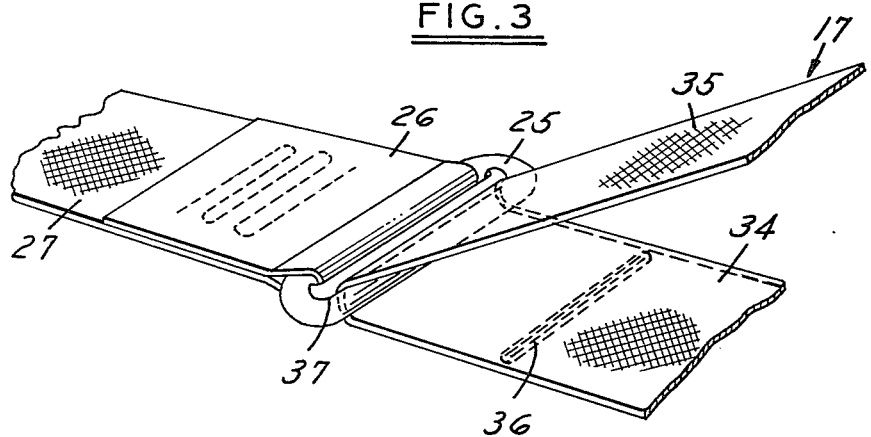

PASSIVE SEAT BELT SYSTEM

BACKGROUND OF THE INVENTION

The prior art discloses many permutations of automobile passive seat belt arrangements that basically comprise a lap belt and a shoulder harness for restraining a seat occupant in a vehicle seating position. In nearly all of the disclosed passive seat belt arrangements, the seat occupant restraining position of the lap belt and shoulder harness is controlled by or related to the position of the vehicle door. That is, when the door is moved from an opened to a closed position, the lap belt and shoulder harness automatically embrace or encircle the seat occupant. When the door is moved from the closed to an opened position, the lap belt and shoulder harness are displaced from the seating position to facilitate egress or ingress from the vehicle passenger compartment. The term "passive," as used in the expression "passive seat belt system," thus means that the seat occupant is not required to do anything but close the car door to become belted in the seat or to open the door to become unbelted.

U.S. Pat. No. 3,976,305 issued Aug. 24, 1976 to Walter Fieni for a "Safety Belt Assembly for a Motor Vehicle" discloses a passive seat belt system that exemplifies one form such a system may take. The disclosed seat belt system comprises a shoulder or torso belt and a transverse or lap belt, generally formed by a single continuous belt of fixed length that is anchored to the vehicle door at upper and lower anchorage points. A belt positioning strap extending from an inboard retractor mechanism is fixedly coupled to the belt intermediate its ends. In door closed position, the portions of the belt between the fixed point at which the strap is coupled to the belt and the lower anchorage point and the fixed point and the upper anchorage point form a lap belt segment and a torso belt segment, respectively.

One problem with the foregoing system is that the belt and control strap must lie in proximity to the seat when in passenger restraining position, and preferably should be raised in door opened position to permit easy ingress/egress to the seating position. Many complicated systems have been proposed for raising the belt system. The aforementioned U.S. Pat. No. 3,976,305 discloses a pnuematically or hydraulically operable variable length arm for lengthening the belt system positioning strap that is responsive to movement of the door for freeing the occupant from the seat upon opening of the door.

Other known systems involve the use of pulleys and cables to move belt positioning devices slidable in tracks and guides in vehicle doors and roof rails.

It is an object of the present invention to accomplish the desired belt raising and lowering operation with a simple and positive improvement to the belt system.

SUMMARY OF THE INVENTION

The present invention relates to a passive seat belt system in which a continuous loop belt is anchored to a hinged vehicle door at upper and lower anchorage points and a control strap extends from an inboard retractor mechanism to a slip ring slidable along the belt. In door closed position, the portions of the belt between the slip ring and the lower anchorage point and the slip ring and the upper anchorage point form a lap belt segment and a torso belt segment, respectively, for restraining a seat occupant on a vehicle seat.

The improvement comprises a fixed web stop located on the lap belt segment that is sized to prevent its passage through the slip ring. Upon engagement of the web stop with the slip ring after predetermined opening movement of the door, the effective length of the torso belt segment becomes fixed and causes the torso segment and retractor strap to be placed under tension as additional strap is drawn from the retractor mechanism as the door is moved from a closed to a fully opened position. The tension on the retractor strap and torso segment causes the two to seek a straight line relationship and the retractor strap and belt segments to be lifted upwardly and forwardly of the occupant seating position.

DESCRIPTION OF THE DRAWINGS

Other objects, advantages and features of the present invention will become more apparent as the description proceeds, reference being had to the accompanying drawings, wherein:

FIG. 2 is an enlarged view of the portion of the seat belt system within the circle 2 of FIG. 1; and FIG. 3 is a view in part similar to FIG. 2 showing the parts in a displaced relationship compared to FIG. 2.

DETAILED DESCRIPTION OF THE INVENTION

Figure 1:
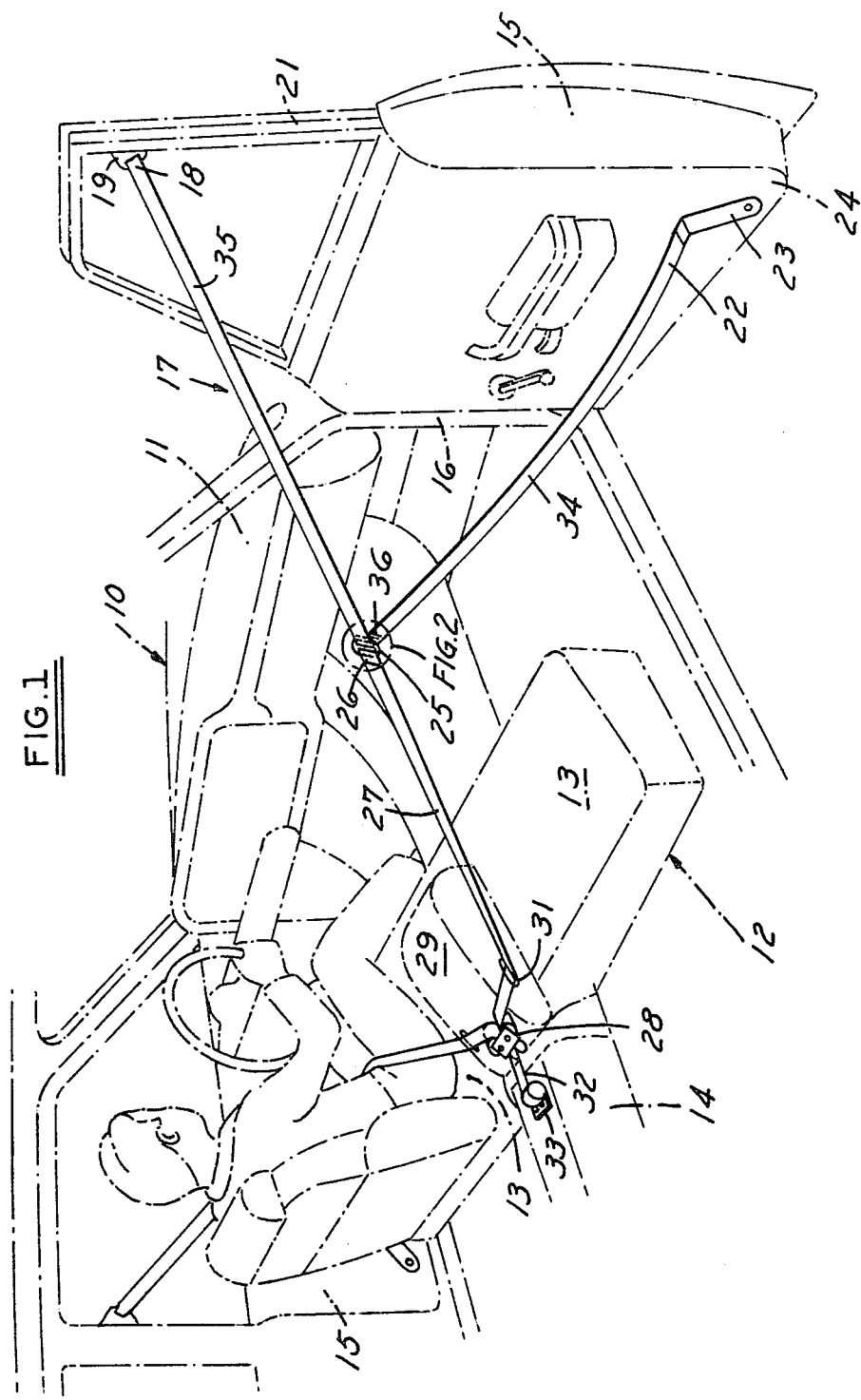
FIG. 1 is a perspective view of a portion of a vehicle body illustrating the orientation of a passive seat belt system embodying the present invention as it appears in door opened position.

Referring now to the drawings, and more particularly to FIG. 1, the seat belt system embodying the present invention is shown as applied to a vehicle body 10 having a door opening 11 permitting ingress/egress to or from a passenger compartment having a vehicle seat 12 providing vehicle seating positions 13 at both sides of the vehicle centerline as indicated by the vehicle driveshaft housing 14 extending longitudinally of the vehicle body. Vehicle doors 15 are hinged in a conventional manner to the front body pillars 16 at each side of the vehicle body passenger compartment for swinging movement in opening and closing directions.

The vehicle seat 12 is illustrated as a bench seat extending the width of the vehicle body. It will be understood that conventional bucket seats positioned on each side of the driveshaft housing 14 can also be accommodated by the disclosed passive seat belt system.

In the following description of the invention, particular reference will be made to the seat belt system on the passenger side of the vehicle body. The driver's seat belt system is the same.

The passive seat belt system for each front seat seating position 13 comprises a fixed length or continuous loop belt generally designated 17, coupled at its upper end 18 to an anchorage device 19, mounted near the upper end of the frame 21 of the door 15 at the vertical edge of the door opposite its hinged edge. The lower end 22 of the belt 17 is coupled to an anchorage 23 coupled to the lower corner 24 of the door substantially in vertical alignment with the upper anchorage 19.

A slip ring or "D" ring 25 is slidable on the belt 17 intermediate its ends. The slip ring 25 is permanently coupled, as best seen in FIGS. 2 or 3, to the free end 26 of a strap or control belt 27. The strap 27 is coupled to a retractor mechanism, generally indicated at 28, of an inertial lock-up type.

In a seat belt system having a bench seat as depicted in FIG. 1, the retractor mechanism 28 preferably is mounted on the seat frame for movement with the seat as the latter is moved fore or aft to accommodate the vehicle operator's desired position relative to the steering wheel and vehicle operating pedals and levers. The retractor mechanism 28 is concealed beneath a fixed inboard armrest 29 provided with suitable side apertures 31. The retractor mechanism 28 may comprise two individual units or a dual unit, i.e., one having two reels to accommodate the driver's seat belt system and the passenger's seat belt system. Since the retractor mechanism(s) 28 is mounted on the seat frame, it is preferable that a tether 32 be attached to the retractor mechanism frame, the tether 32 in turn being secured to an inertia type retractor 33 mechanism anchored to the vehicle floor. The retractor 33 has the capability of assisting the seat adjustment mechanism locking device in holding the seat against forward motion under rapid vehicle deceleration conditions.

In a bucket seat installation, the retractor mechanism(s) 28 could be secured directly to the vehicle floor or the top of the driveshaft housing 14.

The strap 27 is retractable by the retractor mechanism to pull the passenger restraining belt 17 across the occupant seating position 13 as the door is moved from an opened position (see FIG. 1) to a closed position and protractible from the retractor mechanism 28 to permit the door to pull the belt 17 away from the occupant seating position as the door is moved from closed to opened position. In a door closed position, the portion of the belt 34 between the slip ring 25 and the lower anchorage point forms a lap belt segment, and the portion 35 between the slip ring 25 and the upper anchorage point forms a torso belt segment.

One disadvantage of a passive restraint seat belt system as described is that the several segments will not lift off the seating position 13 to an extent sufficient to permit easy or unobstructed ingress/egress to the seat in door opened position. As noted in the Background of the Invention statement, many complicated systems have been proposed to relieve this problem. The present invention provides a simple, effective solution to the problem which ensures that the belt system will be raised sufficiently every time the vehicle door is opened.

Referring to FIGS. 2 and 3, there is provided on the belt 17 a fixed web stop 36. The web stop 36 is shown preferably as a laterally extending stitched rib, but it could be a series of laterally extending raised buttons, a plastic strip or the like, nondisplaceably positioned on the belt webbing. The web stop 36 is located on the belt portion 34 forming the lap belt segment. The web stop 36 is sized so that it cannot pass through the lateral slot 37 in the slip ring 25.

The slip ring 25 is of a size that it will not pass through the aperture 31 in the armrest 29. With the vehicle door 15 closed and the adjacent seating position unoccupied, the strap 27 will be retracted to the extent that the slip ring 25 will abut the armrest wall surface surrounding the aperture 31. The web stop 36 is located on the lap belt portion 34 of the belt 17 so that it too, under the door closed-seat unoccupied condition, will lie in proximity to the slip ring 25.

Without the web stop 36, the slip ring 25 would tend, on door opening movement, to slip down the belt 17 at least to the extent that the strap 27 as it is protracted from the retractor mechanism 28 and the lap belt portion 34 would interfere with optimum access to the seating position. With the web stop 36 on the lap belt portion 34, slippage of the slip ring 25 downwardly is severely restricted. Almost as soon as the movement of the door 15 in opening direction is indicated, the web stop 36 engages the slip ring 25. This results in the length of the torso portion 35 of the door mounted belt 17 being effectively fixed and additional strap 27 being drawn from the retractor mechanism 28. Tension on the strap 27 and torso portion 35 of belt 17 between the retractor mechanism 28 and the upper door anchorage 19 causes the strap 27 and belt torso portion 35 to seek a straight line between the retractor mechanism and anchorage point. The belt system thus is raised upwardly and also forwardly off the seating position as the door 15 is swung outwardly of the vehicle body. There will be slack in the lap belt portion 34 (see FIG. 1) in fully opened position of the door. This provides an enlarged reach zone toward the door pull handle on the inner door panel.

Upon closing movement of the vehicle door after the seating position 13 is occupied, the retractor mechanism 28 causes retraction of the strap 27 and the belt 17 to be pulled across the seat occupant with the lap belt portion 34 pulled across the occupant's pelvic region and the torso belt portion 35 pulled diagonally down across the upper torso of the seat occupant. As shown in FIG. 3, the integral web stop is able to move away from the slip ring to accommodate the webbing requirements across the lap of the seated occupant.

It is to be understood that this invention is not limited to the exact construction illustrated and described above, but that various changes and modifications may be made without departing from the spirit and scope of the invention as defined in the appended claims.

I claim:

1. A passive seat belt system having a belt anchored to a hinged vehicle door at upper and lower anchorage points and a strap extending from an inboard retractor mechanism to a slip ring slidable along the belt.

in door closed position, the portions of the belt between the slip ring and the lower anchorage point and the slip ring and the upper anchorage point forming a lap belt segment and a torso belt segment, respectively, for restraining a seat occupant on a vehicle seat, wherein the improvement comprises a fixed web stop located on the lap belt segment and sized to prevent its passage through the slip ring, upon engagement of the web stop with the slip ring after predetermined opening movement of the door, the effective length of the torso belt segment becoming fixed and causing the torso segment and retractor strap to be placed under tension as additional strap is drawn from the retractor mechanism as the door is moved to fully opened position, the tension on the retractor strap and torso segment causing the two to seek a straight line relationship and the retractor strap and belt segments to be lifted upwardly and forwardly of the occupant seating position.

2. A passive seat belt system according to claim 1, in which:

the web stop positioned on the lap belt segment permits the latter is fully opened position of the door to droop between the slip ring and its lower anchorage point to provide an enlarged reach zone to a door pull handle.

3. A passive seat belt system according to claim 1 or 2, in which:
the relationship of the slip ring and web stop allows the lap belt segment to increase in effective length as the door is moved to a closed position to accommodate the webbing requirements across the lap of a seated occupant in the seating position.

4. A passive seat belt system for a vehicle occupant seating position,
the seat belt system having a fixed length belt coupled at opposite ends to anchorage points on upper and lower portions, respectively, of a vehicle door that is hinged at one of its edges on a vehicle body for swinging movement about a sustantially vertical hinge axis in opening and closing directions,
the belt anchorage points being adjacent an edge of the door opposite its hinged edge,
a slip ring slidable on the belt intermediate the ends of the latter,
the slip ring being fixedly coupled to one end of a strap extending from a retractor mechanism located inboard of the occupant seating position,
the strap being retractable to pull the belt across the occupant seating position as the door is moved from open to closed position and protractable to permit the belt to move away from the occupant seating position when the door is opened,
in a door closed position, the portion of the belt between the slip ring and the lower anchorage point forming a lap belt segment and the portion between the slip ring and the upper anchorage point forming a torso belt segment,
wherein the improvement comprises a fixed web stop located on the lap belt segment,
the web stop being sized to prevent its passage through the slip ring as the latter attempts to slip down the belt towards the lower anchorage point as the vehicle door is swung from a closed position toward an opened position,
upon engagement of the web stop with the slip ring after predetermined opening movement of the door, the effective length of the torso segment becoming fixed and causing additional strap to be drawn from the retractor mechanism as the door is moved to a fully opened position,
tension between the retractor and upper door anchorage point cuasing the retractor strap and torso segment to seek a straight line relationship and the retractor strap and belt segments to be lifted upwardly and forwardly of the occupant seating position.

* * * * *